3,214,427
PROCESS FOR PREPARING 19-NORSTEROIDS OF THE ANDROSTANE, PREGNANE AND CHOLESTANE SERIES AND 10-CYANO-19-NOR-INTERMEDIATES THEREIN
Albert Ercoli, Milan, and Rinaldo Gardi, Carate Brianza, Milan, Italy, assignors to Francesco Vismara S.p.A., a corporation of Italy
No Drawing. Filed May 9, 1963, Ser. No. 279,304
Claims priority, application Italy, May 12, 1962, 9,509/62
15 Claims. (Cl. 260—239.55)

The present invention is concerned with the production of 19-norsteroid compounds. More particularly this invention relates to a new method of producing such compounds from 19-nitrilo 3-hydroxy and acyloxy steroids and from the corresponding 3-keto analogues. The invention also relates to certain new alkylene ketals of 19-nitrilo-3-ketosteroids which are useful as intermediates in said method.

The method of this invention comprises the step of eliminating the cyano group at the 10-position of 19-nitrilosteroids of the androstane, pregnane and cholestane series by the action of an alkali metal or an alkaliamide in the presence of an alcohol to produce directly 19-norsteroid compounds in high yield.

The method of this invention is useful for producing 19-norsteroids unsaturated in 5(6) or in 5(10) positions, which compounds can be easily converted to the corresponding physiologically active Δ⁴-3-keto-19-norsteroids, such as 19-nortestosterone and 19-norprogesterone, or alternatively can be employed as valuable intermediates for the aromatization of the ring A in the synthesis of estrogen hormones.

The method of producing 19-norsteroids and the novel intermediates produced therein are illustrated by the following sequence of formulae:

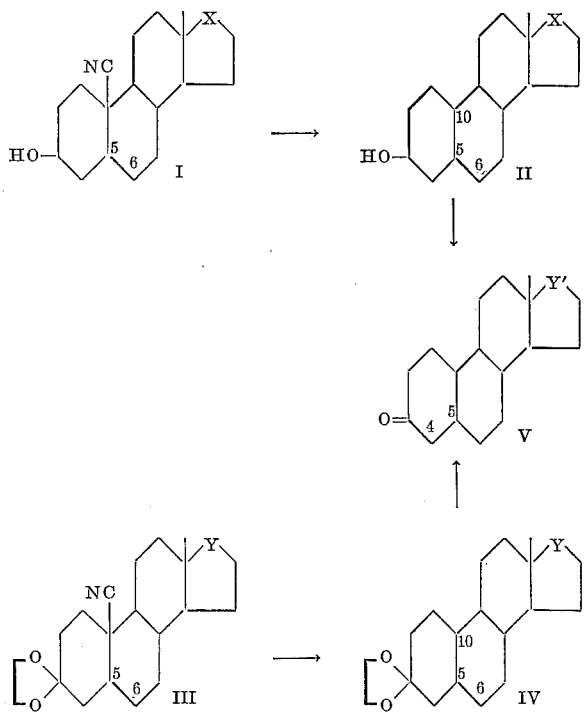

wherein —C₅C₆—, —C₅—C₁₀— and —C₄—C₅— are selected from the group consisting of single and double bonded carbon atoms;

X is selected from the group consisting of

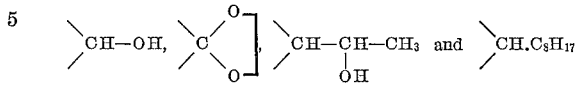

Y is selected from the group consisting of

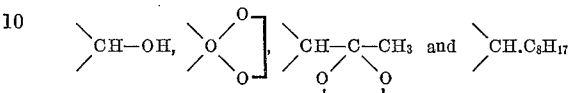

Y' is selected from the group consisting of

>CH—OH, >CO, >CH—CO—CH₃ and >CH.C₈H₁₇ the symbol

represents an alkylene ketal radical of the formula

where R is selected from the group consisting of hydrogen and a lower alkyl radical of from 1 to 3 carbon atoms and n is one of the integers one and two; the alkyl group C₈H₁₇ has the structure

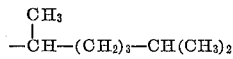

Instead of the free hydroxy steroids of Formula I, there can be used esters thereof with a lower hydrocarbon carboxylic acid containing from 1 to 8 carbon atoms, inclusive. Representative esters of the compounds of Formula I are the formate, acetate, propionate, trimethylacetate, butyrate, benzoate, phenoxyacetate, oenanthate, hemisuccinate, phenylpropionate and cyclopentylpropionate, the acetate being preferred.

The process according to the invention for preparing 19-norsteroids consists in the reaction of the 19-nitrilosteroids of the Formulae I and III with an alkali metal or an alkaliamide and an alcohol. The "denitrilation" can be effected by dissolving the starting compound in an anhydrous alcohol, such as methanol, ethanol, propanol, isopropanol, n. butanol, ter. butanol and the like, and by adding, little by little, the solution to a suspension of the alkali metal or alkaliamide in an inert hydrocarbon solvent. The alkali metal may be lithium, sodium or potassium and the alkali amide may be selected from lithium amide, sodamide and potassium amide. The reaction of this invention can be also conducted by adding to an alcoholic solution of the 19-nitrilosteroid the alkali metal suspended in an inert hydrocarbon solvent or the alkali metal alone in small pieces. When an alkaliamide is used, it can be prepared in the reaction mixture itself by dissolving, little by little, the alkali metal in a solution of the 19-nitrilosteroid in an inert hydrocarbon solvent containing liquid ammonia. Preferably, the "denitrilation" step is carried out with an alkali metal and an alcohol at a temperature between room temperature and the boiling point of the solvent or the solvents mixture employed.

The process of this invention provides 19-norcompounds, saturated or unsaturated. If a saturated 19-nitrilosteroid is used as starting material, there is obtained the corresponding saturated 19-norsteroid. If the starting 19-nitrilosteroid contains a double bond at the 5:6 position, a partial migration of said double bond to 5:10 position simultaneously occurs with the elimination of the cyano group and the 19-norsteroid is recovered at the end of the reaction as a mixture of $\Delta^{5(6)}$ and $\Delta^{5(10)}$-19-norderivatives.

The mixture may be separated into its components, for example by chromatography, but preferably it is employed as such for the further transformations.

More particularly, the hydroxy 19-norsteroids of Formula II, obtained according to the process of this invention from the corresponding hydroxy or acyloxy 19-nitrilo steroids for Formula I, can be converted to 3-keto 19-norderivatives through oxidation. The oxidation can be effected with any oxidizing agent capable of oxiding the hydroxy groups to ketogroups. Preferably, the reaction is conducted using chromic anhydride or sodium dichromate in an acid solution, i.e. sulfuric acid or acetic acid. Instead of chromic acid, there can be used the Oppenauer's reagent, namely cyclohexanone and aluminum isopropylate, as oxidizing agent.

If a double bond is present in the hydroxy steroids of Formula II, it can be previously protected by bromine addition and the bromine atoms can be removed after the oxidation step by treatment with zinc dust and an alcohol. Rearrangement of the double bond from the 5:6 or 5:10 positions to the 4:5 position is promptly obtained by the action of a strongly acid or a strongly alkaline agent, thus converting the $\Delta^{5(6)}$ or $\Delta^{5(10)}$-3-keto 19-norcompounds into $\Delta^4$-3-keto 19-norsteroids.

The 19-nitrilo mono and bis-alkylene ketals of Formula III represent new intermediates for the process of this invention. More specifically, the new steroid compounds are:

5α-androstane-17β-ol-3-one-19-nitrile 3-alkylene ketal,
5α-androstane-3,17-dione-19-nitrile 3,17-bis(alkylene ketal),
5α-pregnane-3,20-dione-19-nitrile 3,20-bis(alkylene ketal),
5α-cholestane-3-one-19-nitrile 3-alkylene ketal and the $\Delta^5$-dehydroanalogs of all of said compounds. By denitrilation of the 19-nitrilo steroids of Formula III according to the process of this invention, there are obtained the corresponding 19-norsteroids mono and bis alkylene ketals of Formula IV which can be easily converted to 3-keto 19-norsteroids (V) by hydrolysis with a mineral acid.

Starting compounds for the process of this invention are 19-nitrilosteroids of Formula I. The compounds corresponding to this formula and belonging to the androstane and pregnane series can be prepared according to the following reaction sequence:

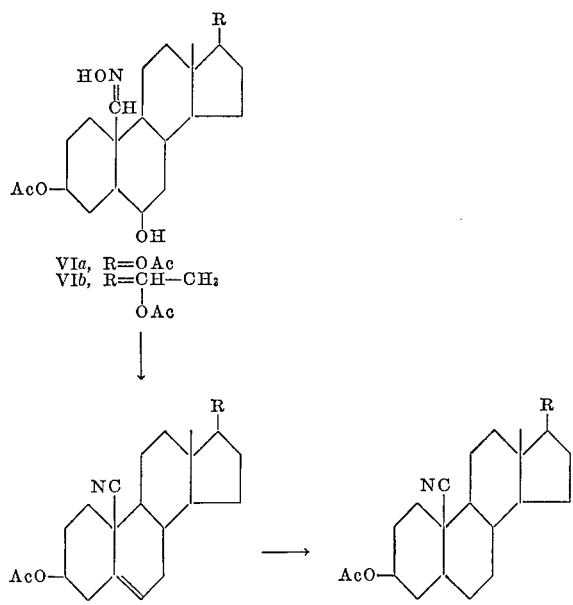

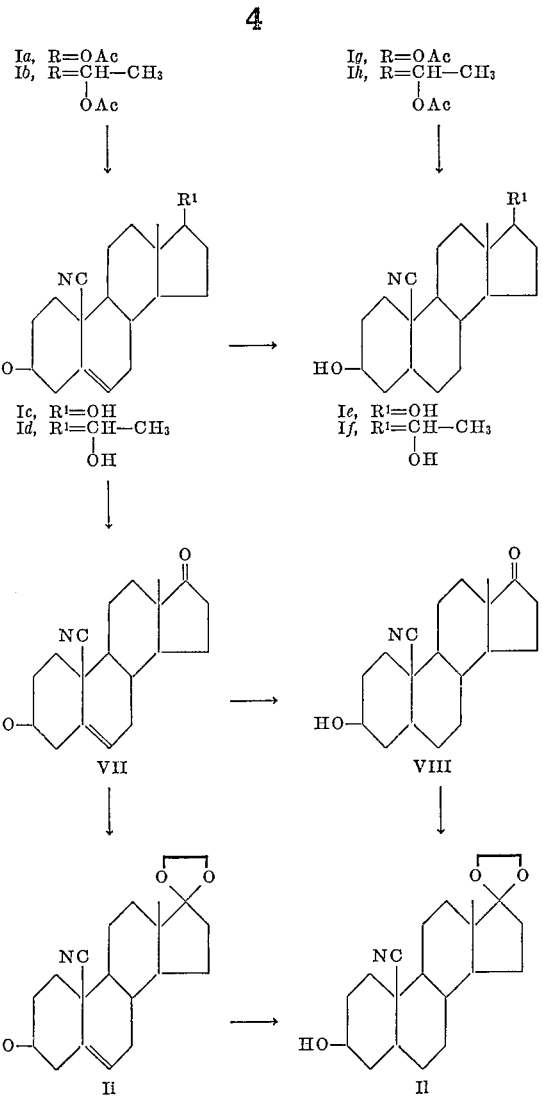

The 19-oximino-6-hydroxy steroids represented by Formulae VIa and VIb are converted to 19-nitrilo-$\Delta^5$-diacyloxy derivatives Ia and Ib, respectively, by the method disclosed in the U.S. copending application, Serial No. 228,242, filed on October 4, 1962, using phosphorus oxychloride as dehydrating agent. The 19-oximino-6-hydroxy steroid, starting material, can be also used in the form of the corresponding nitroso-dimer. Thus, the 19-oximino-3β,17β-diacyloxy-5α-androstane-6β-ol (VIa) or the nitroso-dimer corresponding to the oxime or mixtures thereof are dehydrated with phosphorus oxychloride and pyridine to give 3β,17β-diacyloxy-5-androstene-19-nitrile (Ia).

Similarly, the 19-oximino-3β,20β-diacyloxy-5α-pregnane-6β-ol (VIb) or the corresponding nitroso-dimer or mixtures thereof are converted to 3β,20β-diacyloxy-5-pregnene-19-nitrile (Ib).

The compounds of Formulae Ia and Ib are then subjected to alkaline hydrolysis, e.g. with methanolic potassium or sodium hydroxide, to obtain the compounds of Formulae Ic and Id, such as 5-androstene-3β,17β-diol-19-nitrile and 5-pregnene-3β,20β-diol-19-nitrile, respectively. The thus obtained compounds of Formulae Ic and Id are then catalytically hydrogenated employing conventional hydrogenation methods, e.g. by treatment with hydrogen in the presence of palladium on calcium carbonate to give the corresponding saturated steroids of Formulae Ie and If, such as 5α-androstane-3β,17β-diol-19-nitrile and 5α-pregnane-3β,20β-diol-19-nitrile.

Alternatively, the compounds of Formulae Ie and If are obtained from the corresponding compounds of Formulae Ia and Ib, by carrying out the steps of hydrolysis and catalytic hydrogenation in a reversed order, that is by preparing at first the saturated diacyloxy steroids of Formulae Ig and Ih, respectively, and then hydrolysing these latter under alkaline conditions to obtain the compounds of Formulae Ie and If.

The compound of Formula VII, namely 5-androstene-3β-ol-17-one-19-nitrile, is produced by selective oxidation of 5-androstene-3β,17β-diol-19-nitrile (Ic) with an oxidizing agent, e.g. chromic anhydride in acetone solution as disclosed by T. Jen and M. E. Wolff (J. Med. and Pharm. Chemistry 5, 876; 1962). The 3-hydroxy-17-ketone thus obtained is then converted to the corresponding 17-alkylene ketal of Formula Ii, by reaction with an alkane diol, such as ethylene glycol, propylene glycol, butane-1,2-diol, pentane 1,2- and 1,3-diol and the like, in the presence of an acid catalyst, i.e. p-toluenesulfonic acid. Preferably, the ketalization step is carried out with ethylene glycol.

The 19-nitrilo-androstene-3β-ol-17-one 17-alkylene ketal of Formula Ii is then converted to the corresponding saturated compound of Formula Il by catalytic hydrogenation with hydrogen in the same manner as shown above for the conversion of the Δ5-dehydro derivatives of Formulae Ic and Id to their corresponding saturated compounds of Formulae Ie and If.

Alternatively, the 19-nitrilo-5α-androstane-3β-ol-17-one 17-ethylene ketal of Formula Il can be produced by carrying out at first the catalytic hydrogenation of 5-androstene-3β-ol-17-one 19-nitrile (VII) and then converting the thus obtained 5α-androstane-3β-ol-17-one 19-nitrile of Formula VIII to the corresponding 17-ethylene ketal (Il) with the same procedure indicated above for the ketalization of the compound VII.

The 3-hydroxy-19-nitrilosteroids of the androstane and pregnane series corresponding to the Formula I can be converted to the new 19-nitrilo ketosteroids mono and bis alkylene ketals of the Formula III according to the following reaction sequence:

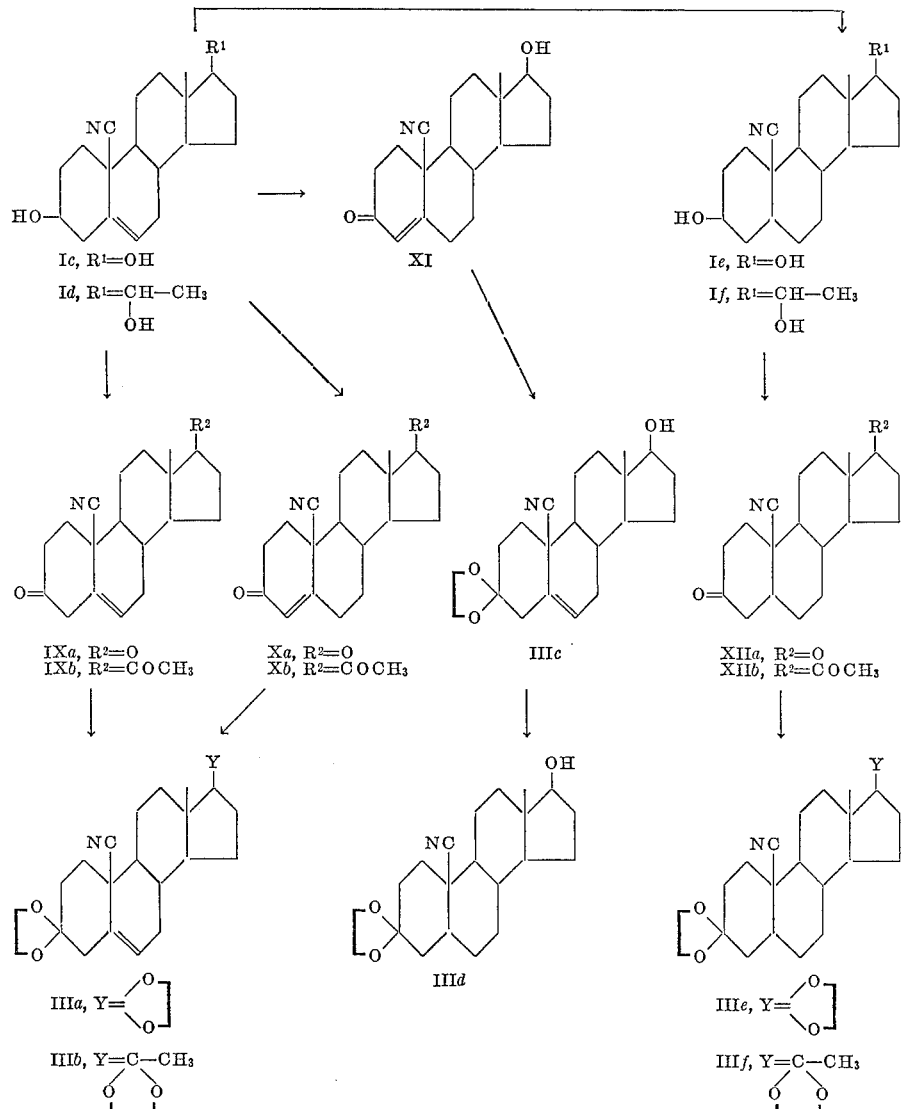

The compounds of Formulae Ic and Id prepared as described above are oxidized, preferably in acetone solution and at room temperature, with an oxidizing agent, such as chromic anhydride or sodium dichromate in sulfuric acid solution, using a slight excess of the oxidizing agent. After the oxidation is complete, the reaction mixture is extracted with an organic solvent such as ether and the compounds of Formulae IXa and IXb, namely 5-androstene-3,17-dione-18-nitrile and 5-pregnene-3,20-dione-19-nitrile, respectively, are recovered by conventional means. The compounds of Formulae IXa and IXb are then converted to the bis(alkylene ketal) of Formulae IIIa and IIIb, respectively, by the action of a ketalizing agent in the presence of an acid catalyst, using an alkanediol, such as ethylene glycol, propylene glycol, butane-1,2-diol, pentane-1,2-and 1,3-diol or the like, but preferably ethylene glycol, as ketalizing agent.

The bis(alkylene ketal) of Formulae IIIa and IIIb can be also obtained from the compounds of Formulae I*c* and I*d* by an alternate way comprising an oxidation step, using cyclohexanone and aluminum isopropylate as oxidizing agent, according to the well known Oppenauer's procedure, in order to obtain the compounds of Formulae X*a* and X*b*, namely 4-androstene-3,17-dione-19-nitrile and 4-pregnene-3,20-dione-19-nitrile respectively, and then subjecting these compounds to the action of the same ketalizing agents, as said above.

The compound of Formula III*c*, namely 19-nitrilo-5-androstene-17β-ol-3-one 3-alkylene ketal, is obtained by treating with an alkanediol and an acid catalyst as mentioned above, the compound of Formula XI, namely 17β-hydroxy-4-androstene-3-one, disclosed by T. Jen and M. E. Wolff (J. Med. and Pharm. Chemistry 5, 878; 1962).

The catalytic hydrogenation of the compound of Formula III*c*, employing conventional hydrogenation methods, e.g. by treatment with hydrogen in the presence of palladium on calcium carbonate, provides the compounds of Formula III*d*, namely 5α-androstane-17β-ol-3-one 3-alkylene ketal.

The compounds of the Formulae III*e* and III*f*, namely 19-nitrilo-5α-androstane-3,17-dione 3,17-bis(alkylene ketal) and 19-nitrilo-5α-pregnane-3,20-dione 3,20-bis(alkylene ketal), are obtained from the dihydroxy steroids of Formulae I*e* and I*f*, respectively, by subjecting these compounds to the action of an oxidizing agent, such as chromium trioxide or sodium dichromate in diluted sulfuric acid solution, to obtain the corresponding diketo compounds of the Formulae XII*a* and XII*b*, respectively and then allowing these latter to react with an alkanediol and preferably with ethylene glycol in the presence of an acid catalyst, using the same reaction disclosed for the preparation of the bis(alkylene ketal) of the Formulae III*a* and III*b*.

The following examples are illustrative of the products and methods of this invention, but are not to be construed as limiting.

PREPARATION 1

*10-cyano-19-nor-5-androstene-3β,17β-diol, diacetate (Ia)*

A solution of 2.4 g. of the 3β,17β-diacetoxy-5α-androstane-6-one (prepared by acetylation with acetic anhydride of the corresponding 3β,17β-dihydroxy compound) in 62 cc. of tetrahydrofuran and 6.2 cc. of water is treated under stirring with 600 mg. of sodium borohydride at room temperature for 4 hours. The excess of sodium borohydride is then decomposed by the addition of dilute acetic acid, the mixture poured into ice water and the precipitate formed is collected by filtration, washed with water and dried under vacuum, thus giving 2 g. of 3,17-diacetate of 5α-androstane-3β,6β,17β-triol. The product recrystallized from dilute methanol melts at 130–131° C.; $[\alpha]_D^{27}$= −30° ±1 (chl. 0.5%).

To a solution of 1.2 g. of the diacetate of 5α-androstane-3β,6β,17β-triol in 20 cc. of dry pyridine, cooled to −5° C., is added dropwise with stirring 1.6 cc. of nitrosyl chloride. Stirring is continued for 4 hours and the temperature maintained at −5° C.; the mixture is then poured into ice water to precipitate the 5α-androstane-3β,17β-diacetoxy-6β-yl nitrite which is collected, washed with water and dried (yield 1.1 g.). After recrystallization from hexane-benzene the product melts at 152–153° C. (dec); $[\alpha]_D^{27}$= −55° ±1 (chl. 0.5%).

A solution of 5.8 g. of the nitrite in 100 cc. of dry toluene in a Pyrex vessel is irradiated by means of a 200-watt mercury arc lamp for 3 hours at a temperature of about 15° C., while a stream of dry nitrogen free from oxygen is passed into the vessel. During the photolysis the solution becomes turbid because the oximino derivative, which formed, separates.

The solid material is then filtered, washed with toluene, dried and recrystallized from benzene to give 3.2 g. of the nitroso-dimer corresponding to the 19-oximino-5α-androstane-3β,6β,17β-triol-3,17-diacetate (VI*a*) melting at 162–163° C.; $[\alpha]_D^{27}$= −79° ±1 (chl. 0.5%). A solution of 1.7 g. of the nitroso-dimer in 50 cc. of dry pyridine is treated, at a temperature around 0° C., by dropwise addition with 10 cc. of phosphorus oxychloride. The reaction mixture is stored at room temperature under anhydrous conditions for 20 hours, then poured into ice-water and extracted with ether. The ethereal solution is washed with dilute hydrochloric acid and an aqueous solution of sodium bicarbonate, successively, then with water and, after being dried over magnesium sulphate, is concentrated to obtain 1.3 g. of 10-cyano - 19-nor-5-androstene-3β,17β-diol diacetate (I*a*). The product melts at 160–161° C. after recrystallization from methyl alcohol; $[\alpha]_D^{27}$= −166° ±2 (chl. 0.5%).

Similarly, by substituting other 3,17-diacyl derivatives of 5α-androstane-3β,17β-diol-6-one for the steroid reactant above mentioned, the corresponding esters of 10-cyano-19-nor-5-androstene-3β,17β-diol are formed such as trimethylacetate, propionate, oenanthate, phenoxyacetate, benzoate, cyclopentylpropionate and the like.

PREPARATION 2

*10-cyano-19-nor-5-pregnene-3β,20β-diol, diacetate (Ib)*

To a solution of 11.3 g. of the 3,20-diacetate of 5α-pregnane-3β,20β-diol-6-one in 110 cc. of tetrahydrofuran is added dropwise under stirring 45 cc. of an aqueous solution containing 1.1 g. of sodium borohydride. Stirring is continued for 8 hours at room temperature and then the excess of sodium borohydride is decomposed by addition of dilute acetic acid. By pouring the mixture into ice-water a precipitate is formed which is filtered, washed with water and dried. There is thus obtained 8 g. of the diacetate of 5α-pregnane-3β,6β,20β-triol. The product recrystallized from hexane shows melting point 169–171° C.; $[\alpha]_D^{25}$=+3° (chl. 0.5%).

IR-spectrum: 3250 cm.$^{-1}$, 1734, 1712, 1250, 1025, 1023.

The above compound (5.2 g.) is dissolved in 30 cc. of dry pyridine, cooled at −5° C. and treated with 2 cc. of nitrosyl chloride added a little at a time, with stirring and maintaining the temperature around −5° C. After a further 4 hours at −5° C., the mixture is poured into ice-water until complete precipitation of the product which is filtered and dried thus giving 5.2 g. of 3β,20β-diacetoxy - 5α-pregnane - 6β-yl nitrite. Recrystallization from methanol-methylene chloride yields the pure product melting at 153–154° C. (dec.); $[\alpha]_D^{25}$= −35° (chl. 0.5%).

IR-spectrum: 1738 cm.$^{-1}$, 1633, 1245, 1031, 785.

A solution of 5 g. of the above compound in 100 cc. of anhydrous toluene is photolyzed in a Pyrex vessel at 10° C. under pure nitrogen, using a Q81 watt high pressure mercury lamp with a Pyrex filter immersed in the reaction solution. After 3 hours, at the end of the irradiation, the precipitate formed is filtered, washed with toluene and dried, thus obtaining 1.45 g. of 3β,20β-diacetoxy-19-nitroso-5α-pregnane-6β-ol (dimer) which recrystallized from acetone-hexane melts at 163–164° C.; $[\alpha]_D^{25}$= −43° (chl. 0.5%). By dilution of the mother liquor with petroleum ether there is obtained 1.2 of 3β,20β-diacetoxy - 19-oximino-5α-pregnane-6β-ol. Total yield: 2.65 g. equal to 53%. The pure 19-oximino compound, recrystallized from ethyl acetate, shows melting point 218–219° C.; $[\alpha]_D^{25}$= −25° (chl. 0.5%).

IR-spectrum: 3500 cm. $^{-1}$, 3240, 1732, 1712, 1244, 1025. No absorption in the ultraviolet.

A mixture of the 19-oximino compound and the nitroso-dimer (2 g.), as obtained above, is dissolved in 37 cc. of dry pyridine and treated with 6 cc. of phosphorus oxychloride. The mixture is kept at room temperature under anhydrous conditions for 15 hours, after which the product is precipitated by the addition of ice-water and collected. There is thus obtained 1.6 g. of 10-cyano-19-nor - 5-pregnene - 3β,20β-diol diacetate (Ib). After recrystallization from methanol-methylene chloride the Melting Point is 189–190° C.; [α]$_D^{25}$= —127° ±1 (chl. 0.5%).

IR-spectrum: 2240, 1732, 1250, 1039 cm. $^{-1}$.

Similarly, by substituting other 3,20-diacyl derivatives of 5α-pregnane-3β,20β-diol-6-one for the steroid reactant above mentioned, the corresponding esters of 10-cyano-19-nor-5-pregnene-3β,20β-diol are formed such as for instance, the formate, propionate, oenanthate, benzoate, p-oxybenzoate, cyclopentylpropionate and the like.

PREPARATION 3

*10-cyano-19-nor-5-androstene-3β,17β-diol (Ic)*

A solution of 1 g. of 10-cyano-19-nor-5-androstene-3β,17β-diol, diacetate in 40 cc. of ethanol is heated to reflux for 3 hours with 10 cc. of 2 N aqueous potassium hydroxide solution. After cooling, the alcohol is removed and water is added to precipitate the 10-cyano-19-nor-5-androstene-3β,17β-diol which is collected, washed with water, dried and recrystallized from ethanol. M.P. 209–210° C.; [α]$_D^{25}$= —174° (dioxane).

IR-spectrum: 3500, 2240, 1090 and 1056 cm. $^{-1}$.

PREPARATION 4

*10-cyano-19-nor-5-pregnene-3β,20β-diol (Id)*

A solution of 1 g. of the compound of the preparation 2 in 40 cc. of methanol is treated to reflux for 2 hours with 10 cc. of aqueous sodium hydroxide solution. By cooling and diluting with water there is obtained 700 mg. of 10-cyano-19-nor-5-pregnene-3β,20β-diol melting at 272–273° C., after a recrystallization from methanol; [α]$_D^{25}$= —180° (chl. 0.5%).
Infrared-spectrum: 3460, 2240, 1060 cm. $^{-1}$.

*Example 1*

19-NOR-5(6)-ANDROSTENE - 3β,17β - DIOL AND 19-NOR-5(10)-ANDROSTENE-3β,17β-DIOL (II, X=>CH—OH)

To a suspension of 10 g. of sodium in 10 cc. of boiling anhydrous toluene is added, with stirring, 1.25 g. of 10-cyano-19-nor-5-androstene - 3β,17β-diol diacetate (Ia), dissolved in a mixture of 15 cc. of ethanol and 15 cc. of anhydrous toluene. Addition is regulated to keep the mixture at boiling; then, at the same rate, an additional 40 cc. of anhydrous ethanol are added. After cooling, the residual sodium is carefully decomposed with 50 cc. of 95% ethanol, then the mixture well diluted with water. The toluic layer is separated and the mother liquors are extracted twice with ether. The organic extracts are combined and washed until neutral, then dried and evaporated to provide 1.05 g. of a crystalline product consisting of a mixture of 19-nor-5(6)-androstene - 3β,17β-diol and 19-nor-5(10) - androstene-3β,17β-diol (II, X=>CH—OH). After crystallization from acetone the product melts at 148–151° C.; [α]$_D^{24}$= +73° (chl. 0.5%).

IR-spectrum: 3460, 3220, 1135, 1074, 1052, 1028 and 956 cm. $^{-1}$.

The same compound is obtained by substituting for the diacetate other 3,17-diacyl derivatives, such as the trimethylacetate, propionate, oenanthate, phenoxyacetate, benzoate, cyclopentylpropionate and the like.

In the same manner 10-cyano - 19-nor-5-androstene-3β,17β-diol (Ic) is converted to a mixture of Δ$^{5(6)}$ and Δ$^{5(10)}$ isomers of 19-nor-androstene-3β,17β-diol.

*Example 2*

19-NOR-4-ANDROSTENE-3,17-DIONE (V, Y'=>CO)

To a solution of 500 mg. of the mixture of 19-nor-5(6) and 5(10)-androstene-3β,17β-diol in 30 cc. of toluene, 6 cc. of cyclohexanone are added and an aliquot of the solvent is distilled off in order to remove any trace of moisture. To the anhydrous solution is added 550 mg. of aluminum isopropoxide dissolved in 10 cc. of anhydrous toluene. The mixture is heated to reflux and small portions of the solvent are periodically distilled. Then the mixture is treated with water containing dilute hydrochloric acid, the toluic layer is separated and the mother liquors extracted twice with ether; the organic layers combined and washed with water are distilled in vapor stream. The residue, extracted with ether, provides 300 mg. of an oil which is dissolved in 25 cc. of methanol and treated with 0.2 cc. of 2 N potassium hydroxide. After 15 minutes of stirring under inert atmosphere, the mixture is concentrated under vacuum and the residue is diluted with water and filtered. There is obtained 210 mg. of 19-nor-4-androstene-3,17-dione (V, Y'=>CO), which recrystallized from methanol, melts at 168–170° C.; [α]$_D^{24}$= +136° (chl. 0.5%).

λ$_{max.}$ at 240 mμ, ε=16,300.

IR-spectrum: 1743, 1675 and 1823 cm. $^{-1}$.

*Example 3*

10-CYANO-19-NOR-5-ANDROSTENE-3β-OL-17-ONE 17-ETHYLENE KETAL (Ii)

To 3 g. of 10-cyano-19-nor-5-androstene-3β-ol-17-one (VII, obtained by selective oxidation of the corresponding 3β,17β-diol derivative Ic with chromic acid in acetone solution as described in Journal of Med. and Pharm. Chemistry 5, 877; 1962) there is added 200 mg. of p-toluenesulfonic acid, 10 cc. of ethylene glycol and 50 cc. of benzene. The solution is refluxed for 15 hours, the condensate being passed through a water trap to separate the water of reaction. The reaction mixture is then neutralized with a few drops of pyridine and concentrated under vacuum. The residue is purified from methanol-ether to give 10-cyano-19-nor-5-androstene-3β-ol-17-one 17-ethylene ketal (Ii)

*Example 4*

19-NOR - 5(6)-ANDROSTENE-3β-OL-17-ONE 17-ETHYLENE KETAL AND 19-NOR-5(10)-ANDROSTENE-3β-OL-17-ONE 17-ETHYLENE KETAL

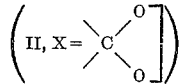

A solution of 1.59 g. of the compound of Example 3 in 30 cc. of tetrahydrofurane and 30 cc. of absolute ethyl alcohol is dropped into 300 cc. of liquid ammonia. 3.85 g. of lithium in small pieces are added with caution and the mixture is maintained under stirring until the blue color of the solution is discharged.

50 cc. of ethanol are added and ammonia is left to evaporate maintaining the mixture on water bath, until the volume is reduced to about 100 cc.

200 cc. of ether are added and the mixture is refluxed to remove ammonia completely. After dilution with water, the organic layer is separated, washed with water, dried over sodium sulfate and evaporated. The residue, recrystallized from acetone, provides a crystalline product consisting of a mixture of 19-nor-5(6)-androstene-3β-ol-17-one 17-ethylene ketal and 19-nor-5(10)-androstene-3β-ol-17-one 17-ethylene ketal

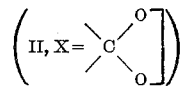

Example 5

10-CYANO-19-NOR-5α-ANDROSTANE-3β,17β-DIOL (Ie)

0.2 g. of palladium oxide on calcium carbonate (1% Pd.) are suspended in a mixture of 10 cc. of tetrahydrofurane and 3 cc. of methanol and hydrogenated. Then there is added a solution of 1 g. of 3β,17β-diacetoxy-10-cyano-19-nor-5-androstene (Ia) in 10 cc. of tetrahydrofurane. The reaction mixture is hydrogenated at room temperature (25° C. about). The catalyst is filtered and the mixture concentrated under vacuum. The residue, consisting of 3β,17β - diacetoxy - 10-cyano-19-nor-5α-androstane (Ig) is heated to reflux for 3 hours with 8 cc. of 2 N aqueous potassium hydroxide solution to give 10-cyano-19-nor-5α-androstane-3β,17β-diol (Ie).

The same product is obtained by hydrogenating 10-cyano-19-nor-5-androstene-3β,17β-diol (Ic) as described above.

Example 6

19-NOR-5α-ANDROSTANE-3β,17β-DIOL (II, X=>(CH—OH)

The compound of the Example 5 is dissolved, without further purification, in 50 cc. of anhydrous isopropyl alcohol. After boiling, the heat source is removed and 6 g. of potassium in small pieces are added, regulating the addition to keep the mixture at boiling. The reaction mixture is cooled and treated at first with 50 cc. of 95% ethyl alcohol, then with water After repeated extractions with ether, the organic extracts are washed with water until neutral, dried and evaporated. The residue, recrystallized from methanol, provides 19-nor-5α-androstane-3β,17β-diol (II, X=>CH—OH), M.P. 168–170° C.; $[\alpha]_D^{20}=+37°$ (chl. 0.5%).

Example 7

10-CYANO-19-NOR-5α-ANDROSTANE-3β-OL-17-ONE 17-ETHYLENE KETAL (Il)

1 g. of compound Ii prepared as in Example 3, is hydrogenated with palladium on calcium carbonate, following the procedure described in Example 5 and converted to 10-cyano-19-nor-5α-androstane-3β-ol - 17 - one 17-ethylene ketal (Il).

Example 8

19-NOR-5(6)-PREGNENE-3β,20β-DIOL AND
19-NOR-5(10)-PREGNENE-3β,20β-DIOL

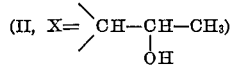

To a solution of 1.25 g. of 10-cyano-19-nor-5(6)-pregnene-3β,20β-diol (Id) in 50 cc. of isopropyl alcohol there is added with stirring 5 g. of small pieces of sodamide over approximately a twenty minute period. The mixture is maintained at the boiling temperature for 20 minutes, then cooled followed by cautious addition of 95% ethyl alcohol. After dilution with water, the mixture is extracted with ether and the ether extracts are washed with water, dried over sodium sulfate and evaporated. The residue, recrystallized from acetone, provides 0.965 g. of a mixture of 19-nor-5(6)-pregnene-3β,20β-diol and 19-nor-5(10)-pregnene-3β,20β-diol

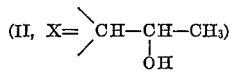

Said mixture crystallizes well and shows M.P. 160–162° C.; $[\alpha]_D=+70°$ (chl. 0.5%).

Spectrum IR: 3460, 3400, 1150, 1119, 1038, 1016 and 966 cm.$^{-1}$.

The same mixture is obtained by substituting 3β,20β-diacetoxy-10-cyano-19-nor-5(6)-pregene (Ib) for the compound Id in the procedure described above.

Example 9

19-NOR-4-PREGNENE-3,20-DIONE
(V, Y'=>CH—CO—CH₃)

275 mg. of the mixture of 19-nor-pregnene-3β,20β-diols, obtained as described in Example 8, are dissolved in 75 cc. of chloroform and treated with a solution of 160 mg. of bromine in 4 cc. of chloroform. After evaporating the solvent with caution, the bromo derivatives are dissolved in 15 cc. of acetic acid and treated with a solution of 300 mg. of chromic anhydride in 3 cc. of acetic acid. The mixture is allowed to stand overnight at room temperature, then it is poured into water and extracted with ether. The residue, obtained by evaporating the ether extracts, is dissolved in 43 cc. of ethanol and refluxed for three hours with 600 mg. of zinc dust. After removing the zinc in excess, the ethanol is completely evaporated and the residue dissolved in 30 cc. of methanol and treated with 0.2 cc. of 2 N potassium hydroxide. The mixture, after stirring under inert atmosphere for 15 minutes, is concentrated under vacuum and the residue diluted with water and filtered to give 19-nor-Δ⁴-pregnene-3,20-dione (V, Y'=>CH—CO—CH₃). The product recrystallized from methanol shows M.P. 144–145° C., undepressed in admixture with an authentic specimen.

Example 10

10-CYANO-19-NOR-5α-PREGNANE-3β,20β-DIOL (If)

1 g. of 3β,20β-diacetoxy-10-cyano-19-nor-5-pregnene is hydrogenated with palladium on calcium carbonate following the procedure described in Example 5 to give 3β,20β-diacetoxy - 10 - cyano-19-nor-5α-pregnane (Ih) which treated with aqueous potassium hydroxide solution yields the free 3β,20β-diol (If).

The same product is obtained by hydrogenating 10-cyano-19-nor-5-pregnene-3β,20β-diol (Id) according to the procedure of Example 5.

Example 11

19-NOR-5α-PREGNANE-3β,20β-DIOL

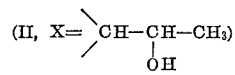

Following the procedures of Example 1, but employing 10-cyano-19-nor-5α-pregnane-3β,20β-diol (If) as starting material, there is obtained 19-nor-5α-pregnane-3β,20β-diol

Example 12

19-NOR-5α-PREGNANE-3,20-DIONE
(V, Y'=>CH—CO—CH₃)

The compound of Example 11 is suspended in 380 cc. of purified acetone and treated, drop by drop, at room temperature and under nitrogen atmosphere, with 5 cc. of a 8 N solution of chromic acid. After stirring for 5 minutes, the mixture is poured into water and extracted with ether. The ether extracts washed with water, dried and evaporated yield 1.35 g. of 19-nor-5α-pregnane-3,20-dione V, Y'=>CH—CO—CH₃). Recrystallization from a small volume of methanol provides the pure product.

Example 13

19-NOR-5(6)-CHOLESTENE-3β-OL AND
19-NOR-5(10)-CHOLESTENE-3β-OL (II, X=>CH.C₈H₁₇)

Following the procedure of Example 1, but employing 10-cyano-19-nor-5(6)-cholestene-3β-ol (I, X=>CH.C₈H₁₇)

prepared by Barton et alia, J. Am. Chem. Soc. 83, 4082;

1961) as starting material, there is obtained 19-nor-5(6)-cholestene-3β-ol in admixture with 19-nor-5(10)-cholestene-3β-ol (II, X=>CH.C$_8$H$_{17}$).

Example 14

19-NOR-4-CHOLESTENE-3-ONE (V, Y'=>CH.C$_8$H$_{17}$)

The mixture of the compounds obtained in Example 13 is treated with cyclohexanone and aluminum isopropoxide according to the procedure described in Example 2 to give 19-nor-4-cholestene-3-one, $[\alpha]_D^{26}$=+42.2° (chl. 1%).

Example 15

19-NORCHOLESTANE-3β-OL (II, X=>CH.C$_8$H$_{17}$)

10-cyano-19-norcholestane-3β-ol (I, X=>CH.C$_8$H$_{17}$) is prepared from 19-nor-5-cholestene-3β-ol 3-acetate (J. Am. Chem. Soc. 83, 4082; 1961) according to the procedure described in Example 5 and converted by the procedure of Example 6 to 19-norcholestane-3β-ol (II, X=>CH.C$_8$H$_{17}$).

Example 16

10-CYANO-19-NOR-5-PREGNENE-3,20-DIONE (IXb)

To a solution of 500 mg. of 10-cyano-19-nor-5-pregnene-3β,20β-diol (Id) in 80 cc. of dry pure acetone there is added, under nitrogen atmosphere and at room temperature, 1 cc. of a 8 N solution of chromic acid (prepared by treating 26.7 g. of chromium trioxide with 23 cc. of concentrated sulfuric acid and by diluting the resulting mixture with distilled water to 100 cc.). The reaction mixture is stirred under nitrogen atmosphere for 5 minutes, then poured into ice-water saturated with sodium chloride and extracted with ether. The ethereal solution is washed with water, dried over sodium sulfate and the ether evaporated to give 322 mg. of 10-cyano-19-nor-5-pregnene-3,20-dione (IXb). After recrystallization from methanol the product melts at 188–192° C.; $[\alpha]_D^{25}$=−45° (dioxane).

IR-spectrum: 2250, 1734, 1700 cm.$^{-1}$. No absorption in the ultraviolet.

Example 17

10-CYANO-19-NOR-5-PREGNENE-3,20-DIONE 3,20-BIS(ETHYLENE KETAL) (IIIb)

To a boiling solution of 300 cc. of anhydrous benzene free from thiophene containing 20 cc. of ethylene glycol and 250 mg. of p-toluenesulfonic acid is added 4 g. of 10-cyano-19-nor-5-pregnene-3,20-dione (IXb).

The mixture is refluxed for 15 hours in the absence of moisture, then it is neutralized with a few drops of pyridine and concentrated under vacuum. The residue recrystallized from methanol-methylene chloride yields 10-cyano - 19 - nor-5-pregnene-3,20-dione 3,20-bis(ethylene ketal) (IIIb), melting at 207–208° C.; $[\alpha]_D^{25}$=−82° (dioxane).

The same product is obtained by applying the procedure of this example to 10-cyano-19-nor-4-pregnene-3,20-dione (Xb) described in J. of Med. and Pharm. Chemistry 5, 878; 1962.

Example 18

19-NOR-5(6)-PREGNENE - 3,20 - BIS(ETHYLENE KETAL) AND 19-NOR - 5(10)-PREGNENE - 3,20 - BIS(ETHYLENE KETAL)

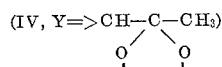

820 mg. of the compound of Example 17 are dissolved in 300 cc. of boiling absolute ethanol and treated with 20 g. of sodium metal added little by little in the course of 2 hours. A portion of the alcohol is then distilled off and the remaining solution is cautiously diluted with water, while the temperature is maintained around 0° C. by cooling with ice. The mixture is extracted thoroughly with ether; the combined extracts are washed with water, dried and the solvent evaporated to give 672 mg. of a crystalline product consisting of a mixture of Δ$^{5(6)}$ and Δ$^{5(10)}$ isomers of 19 - nor-pregnene-3,20-dione 3,20-bis(ethylene ketal)

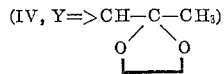

melting at 134–140° C.

Example 19

19-NORPROGESTERONE (V, Y'=>CH—CO—CH$_3$)

100 mg. of the mixture of the two 3,20-bis(ethylene ketal) isomers obtained in Example 18 are dissolved in 5 cc. of boiling methanol and treated for 20 minutes with dilute hydrochloric acid to give 66 mg. of 19-norprogesterone (V, Y'=>CH—CO—CH$_3$) melting at 141–143° C.

Example 20

10-CYANO-19-NOR-5-ANDROSTENE-3,17-DIONE (IXa)

A solution of 2.1 g. of 10-cyano-19-nor-5-androstene-3β,17β-diol (Ic) in 100 cc. of dry acetone is reacted under nitrogen atmosphere and at room temperature with 5 cc. of a 8 N solution of chromic acid. The reaction mixture is then treated as described in Example 16 to give 1.35 g. of 10-cyano-19-nor-4-androstene-3,17-dione (IXa). M.P. 152–156° C.; $[\alpha]_D$=−69° (chl. 0.5%).

Example 21

10-CYANO-19-NOR-5-ANDROSTENE-3,17-DIONE-3,17-BIS(ETHYLENE KETAL) (IIIa)

To a solution of 840 mg. of the compound (IXa) of Example 20 in 75 cc. of benzene is added 5 cc. of ethylene glycol containing 50 mg. of p-toluenesulfonic acid. After distillation, neutralization with pyridine and concentration under the same conditions as those of Example 17, a residue is obtained which, recrystallized from methanol, gives 785 mg. of 10 - cyano - 19-nor-5-androstene-3,17-dione 3,17 - bis(ethylene ketal) (IIIa). M.P. 211–212° C.; $[\alpha]_D^{24}$=−133° (chl. 0.5%).

IR-spectrum: 2240, 1175, 1106, 1033 and 954 cm.$^{-1}$.

The same product is obtained by applying the above procedure to 10 - cyano-19-nor-4-androstene-3,17-dione (Xa) described in J. Med. and Pharm. Chemistry 5, 878; 1962.

Example 22

19-NOR-4-ANDROSTENE-3,17-DIONE (V, Y'=>CO)

850 mg. of the compound of Example 21 are dissolved in 350 cc. of boiling absolute ethanol and treated with 20 g. of sodium metal as described in Example 18. Following the procedure of the same example, a mixture of Δ$^{5(6)}$ and Δ$^{5(10)}$ isomers of 19-nor-androstene-3,17-dione 3,17-bis(ethylene ketal) is obtained. The mixture dissolved in boiling methanol and hydrolyzed with hydrochloric acid provides 19 - nor - androstene-3,17-dione (V, Y'=>CO).

Example 23

10-CYANO-19-NOR-5-ANDROSTENE-17β-OL-3-ONE 3-ETHYLENE KETAL (IIIc)

To a boiling solution of 250 cc. of anhydrous benzene containing 18 cc. of ethylene glycol and 200 mg. of p-toluenesulfonic acid is added 3.5 g. of 10-cyano-19-nor-4-androstene-17β-ol-3-one (described in J. Med. and Pharm. Chemistry 5, 878; 1962). The reaction mixture is treated as described in Example 17 to give 10-cyano-19-nor-5-androstene-17β-ol 3-one 3-ethylene ketal (IIIc).

Example 24

19-NOR-4-ANDROSTENE-17β-OL-3-ONE (V, Y'=>CHOH)

The compound obtained in Example 23 (900 mg.) dissolved in 300 cc. of absolute ethanol is treated with 20 g. of sodium metal as described in Example 18 to give a mixture of 3-ethylene ketals of 19-nor-5(6)-androstene-17β-ol-3-one and 19-nor-5(10)-androstene-17β-ol-3-one (IV, Y=>CHOH).

From these compounds 19-nor-4-androstene-17β-ol-3-one (V, Y'=>CHOH) is prepared by hydrolysis with hydrochloric acid.

*Example 25*

10-CYANO-19-NOR-5α-ANDROSTANE-17β-OL-3-ONE 3-ETHYLENE KETAL (IIId)

1 g. of the compound IIIc prepared as described in Example 23 is hydrogenated with palladium on calcium carbonate following the procedure of Example 5 and converted into 10-cyano-19-nor-5α-androstane-17β-ol-3-one 3-ethylene ketal (IIId).

*Example 26*

19-NOR-5α-ANDROSTANE-17β-OL-3-ONE (V, Y'=>CHOH)

A solution of 1.1 g. of 10-cyano-19-nor-5α-androstane-17β-ol-3-one 3-ethylene ketal (IIId) in 400 cc. of absolute ethanol is treated with 25 g. of sodium metal as in Example 18 and the product obtained is then hydrolyzed with hydrochloric acid to give the 19-nor-5α-androstane-17β-ol-3-one (V, Y'=>CHOH).

*Example 27*

10-CYANO-19-NOR-5α-ANDROSTANE-3,17-DIONE (XIIa, R²=O)

A solution of 500 mg. of 10-cyano-19-nor-5α-androstane-3β,17β-diol (Ie) (obtained by catalytic hydrogenation of the compound Ic), in 80 cc. acetone is treated with 1 cc. of an 8 N solution of chromic acid as described in Example 16 and converted into 10-cyano-19-nor-5α-androstane-3,17-dione (XIIIa, R²=O).

*Example 28*

10-CYANO-19-NOR-5α-ANDROSTANE-3,17-DIONE 3,17-BIS(ETHYLENE KETAL)

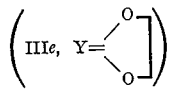

A solution of 2 g. of 10-cyano-19-nor-5α-androstane-3,17-dione (XIIa) in 200 cc. of anhydrous benzene containing 10 cc. of ethylene glycol and 125 mg. of p-toluenesulfonic acid is treated as described in Example 17 to yield 10-cyano-19-nor-5α-androstane-3,17-dione 3,17-bis(ethylene ketal)

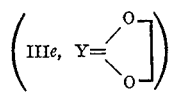

*Example 29*

10-CYANO-19-NOR-5α-PREGNANE-3,20-DIONE (XIIb, R²=COCH₃)

10-cyano-19-nor-5α-pregnane-3,20-diol (If) (prepared by catalytic hydrogenation of the compound Id) is reacted with an 8 N solution of chromic acid under the same conditions of Example 16 and transformed into 10-cyano-19-nor-5α-pregnane-3,20-dione (XIIb, R²=COCH₃).

*Example 30*

19-NOR-5α-PREGNANE-3,20-DIONE (V, Y'=>CH—CO—CH₃)

2 g. of 10-cyano-19-nor-5α-pregnane-3,20-dione (XIIb) is reacted with 10 cc. of ethylene glycol as in Example 17 to give 10-cyano-19-nor-5α-pregnane-3,20-dione 3,20 - bis (ethylene ketal)

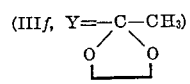

By treating a solution of the compound IIIf in absolute ethanol with sodium metal as in Example 24 and by submitting the resulting 19-nor-5α-pregnane-3,20-bis(ethylene ketal) to hydrolysis with hydrochloric acid, the 19-nor-5α-pregnane-3,20-dione is produced, at M.P. 140–142° C.

We claim:

1. In a process for producing 19-norsteroid compounds the step comprising denitrilating with a reagent selected from the group consisting of an alkali metal and an alkaliamide in the presence of an alcohol a 10-cyano-19-norsteroid selected from the group consisting of:

(a) a compound of the formula:

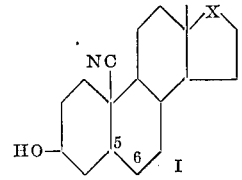

wherein —C₅–C₆— is selected from the group consisting of single and double bonded carbon atoms and; X is a grouping selected from the group consisting of

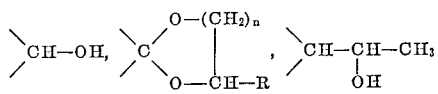

and

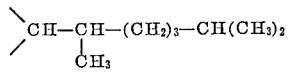

R being selected from the group consisting of hydrogen and a lower alkyl radical and n being one of the integers one and two, (b) esters of said last-mentioned compound with a lower hydrocarbon carboxylic acid, and (c) a compound of the formula:

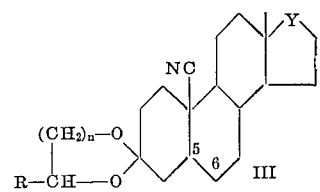

wherein Y is a grouping selected from the group consisting of

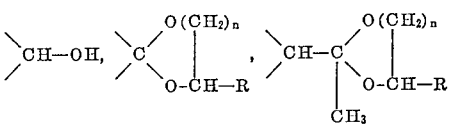

and

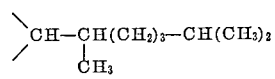

and R, n and —C₅–C₆— have the same meaning as above, when —C₅–C₆— is single bonded, the compound of Formula I and said esters thereof are converted to a compound of the formula:

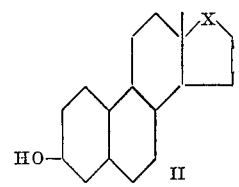

wherein X is as defined above and when —C₅–C₆— is double bonded, said compound of Formula I and said esters thereof are converted to a mixture of Δ⁵⁽⁶⁾ and Δ⁵⁽¹⁰⁾ isomers corresponding to the compound of Formula II and whereby when —C₅–C₆— is single bonded, the compound of Formula III is converted to a compound of the formula:

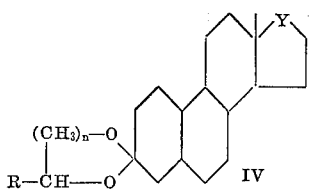

wherein Y, R and $n$ are as defined above and when —$C_5$–$C_6$— is double bonded, said compound of Formula III is converted to a mixture of $\Delta^{5(6)}$ and $\Delta^{5(10)}$ isomers corresponding to the compound of Formula IV.

2. In a process for producing 19-norsteroid compounds the step comprising denitrilating a 10-cyano-19-nor-steroid selected from the group consisting of
(a) a compound of the formula:

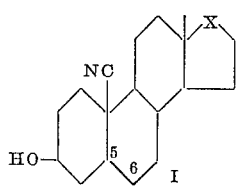

wherein —$C_5$–$C_6$— is selected from the group consisting of single and double bonded carbon atoms, X is a grouping selected from the group consisting of

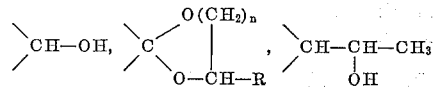

and

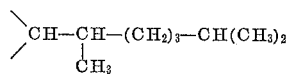

R is selected from the group consisting of hydrogen and a lower alkyl radical and $n$ is one of the integers one and two, and
(b) esters thereof with a lower hydrocarbon carboxylic acid, with a reagent selected from the group consisting of an alkali metal and an alkaliamide in the presence of an alcohol to produce when —$C_5$–$C_6$— is single bonded, a compound of the formula:

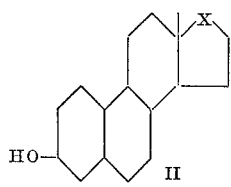

wherein X is as defined above and when —$C_5$–$C_6$— is double bonded, a mixture of $\Delta^{5(6)}$ and $\Delta^{5(10)}$ isomers corresponding to the compound of Formula II.

3. A process as claimed in claim 2 in which

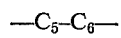

of the starting compound is double bonded, the product is a mixture of $\Delta^{5(6)}$ and $\Delta^{5(10)}$ isomers, and said mixture is separated into its components.

4. In a process for producing 19-norsteroid compounds the step comprising denitrilating a 10-cyano-19-nor-steroid of the formula:

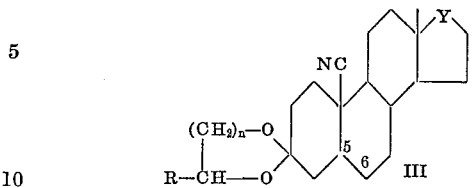

wherein —$C_5$–$C_6$— is selected from the group consisting of single and double bonded carbon atoms, and Y is a grouping selected from the group consisting of

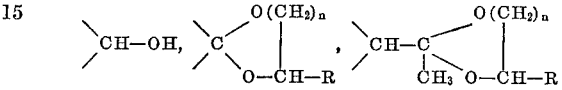

and

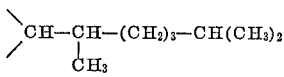

R is selected from the group consisting of hydrogen and a lower alkyl radical and $n$ is one of the integers one and two, with a reagent selected from the group consisting of an alkali metal and an alkaliamide in the presence of an alcohol to produce when —$C_5$–$C_6$— is single bonded, a compound of the formula:

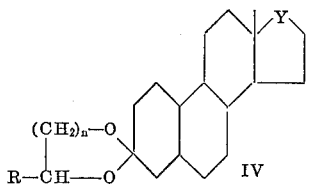

wherein Y, R and $n$ are as defined above and when —$C_5$–$C_6$— is double bonded, a mixture of $\Delta^{5(6)}$ and $\Delta^{5(10)}$ isomers corresponding to the compound of Formula IV.

5. A process as claimed in claim 4 in which

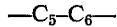

of the starting compound is double bonded, the product is a mixture of $\Delta^{5(6)}$ and $\Delta^{5(10)}$ isomers, and said mixture is separated into its components.

6. A process for the production of $\Delta^4$-3-keto-19-norsteroids selected from the group consisting of 19-norandrostenedione, 19-nortestosterone, 19-norprogesterone and 19-norcholestenone that comprises denitrilating a 10-cyano-19-nor-$\Delta^5$-steroid of the formula:

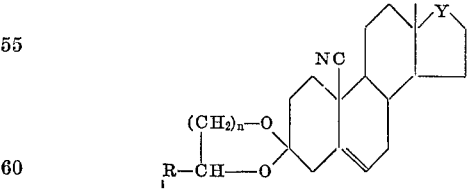

wherein Y is a grouping selected from the group consisting of

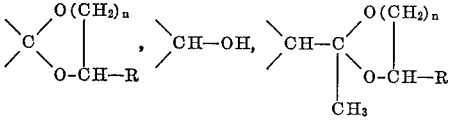

and

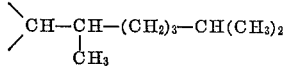

R is selected from the group consisting of hydrogen and a lower alkyl radical and $n$ is one of the integers one and two, with a reagent selected from the group consisting of an alkali metal and an alkaliamide in the presence of an alcohol and treating the resulting $\Delta^{5(6)}$ and $\Delta^{5(10)}$ isomers of the corresponding 19-norsteroid with a mineral acid to form the corresponding 19-nor-4-androstene-3,17-dione, 19-nor-4-androstene-17β-ol-3-one, 19-nor-4-pregnene-3,20-dione and 19-nor-4-cholestene-3-one, respectively.

7. A process for the production of 19-norandrostenedione which comprises denitrilating 10-cyano-19-nor-5-androstene-3,17-dione 3,17-bis (ethylene ketal) with a reagent selected from sodium metal and lithium amide in the presence of ethanol and treating the resulting mixture of $\Delta^{5(6)}$ and $\Delta^{5(10)}$ isomers of 19-norandrostene-3,17-dione 3,17-bis(ethylene ketal) with a mineral acid to product 19-nor-4-androstene-3,17-dione.

8. A process for the production of 19-nortestosterone which comprises denitrilating 10-cyano-19-nor-5-androstene-17β-ol-3-one 3-ethylene ketal with a reagent selected from sodium metal and lithium amide in the presence of ethanol and treating the resulting mixture of $\Delta^{5(6)}$ and $\Delta^{5(10)}$ isomers of 19-norandrostene-17β-ol-3-one 3-ethylene ketal with a mineral acid to produce 19-nor-4-androstene-17β-ol-3-one.

9. A process for the production of 19-norprogesterone which comprises denitrilating 10-cyano-19-nor-5-pregnene-3,20-dione 3,20-bis(ethylene ketal) with a reagent selected from sodium metal and lithium amide in the presence of ethanol and treating the resulting mixture of $\Delta^{5(6)}$ and $\Delta^{5(10)}$ isomers of 19-norpregnene-3,20-dione 3,20-bis(ethylene ketal) with a mineral acid to produce 19-nor-4-pregnene-3,20-dione.

10. A 10-cyano-19-nor-steroid of the formula:

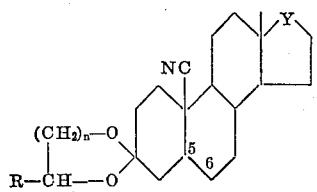

wherein Y is a grouping selected from the group consisting of

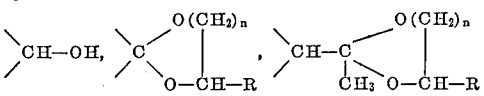

and

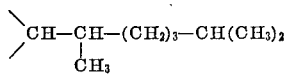

R is selected from the group consisting of hydrogen and lower alkyl radicals, n is one of the integers one and two and —$C_5$–$C_6$— is selected from the group consisting of single and double bonded carbon atoms Y being other than

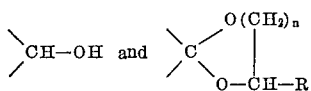

when —$C_5$–$C_6$— is double bonded.

11. 10-cyano-19-nor-5-pregnene-3,20-dione 3,20-bis (ethylene ketal).

12. 10-cyano-19-nor-5-cholestene-3-one 3-ethylene ketal.

13. 10-cyano-19-nor-5α-androstane-17β-ol-3-one 3-ethylene ketal.

14. 10-cyano-19-nor-5α-androstane-3,17-dione 3-17-bis (ethylene ketal).

15. 10-cyano-19-nor-5α-pregnane-3,20-dione 3,20-bis (ethylene ketal).

References Cited by the Examiner

Jen et al.: "Jour. Med. and Pharm. Chem." (1962), pages 876–877 relied on.

Lowenthal: "Tetrahedron" (1959), vol. 6, No. 4, page 287 relied on.

LEWIS GOTTS, *Primary Examiner.*